(12) United States Patent
Barca et al.

(10) Patent No.: US 11,951,688 B2
(45) Date of Patent: Apr. 9, 2024

(54) GENERATOR INJECTION TOOL

(71) Applicant: Siemens Energy, Inc., Orlando, FL (US)

(72) Inventors: Anthony Barca, North Huntingdon, PA (US); Lucas Ramsey, Landenberg, PA (US); Bryce Merrill, Pittsburgh, PA (US); Eric Evans, Waxhaw, NC (US); Michael A. Hall, Greensburg, PA (US); Carl R. Larson, Murrysville, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 279 days.

(21) Appl. No.: 17/657,206

(22) Filed: Mar. 30, 2022

(65) Prior Publication Data
US 2023/0311424 A1 Oct. 5, 2023

(51) Int. Cl.
| | | |
|---|---|---|
| *H02K 15/12* | (2006.01) | |
| *B29C 65/54* | (2006.01) | |
| *B29C 65/82* | (2006.01) | |
| *H02K 3/34* | (2006.01) | |
| *H02K 5/04* | (2006.01) | |
| *B29L 31/00* | (2006.01) | |

(52) U.S. Cl.
CPC ........ *B29C 65/542* (2013.01); *B29C 65/8253* (2013.01); *H02K 3/345* (2013.01); *H02K 5/04* (2013.01); *B29L 2031/749* (2013.01)

(58) Field of Classification Search
CPC .. B29C 65/542; B29C 65/8253; H02K 3/345; H02K 5/04; H02K 15/00; H02K 15/12; H02K 3/48; H02K 15/0006
See application file for complete search history.

(56) References Cited

U.S. PATENT DOCUMENTS

| 2010/0215844 A1 | 8/2010 | Aoki |
| 2016/0359396 A1 | 12/2016 | Lambert |
| 2018/0059187 A1 | 3/2018 | Choi et al. |

FOREIGN PATENT DOCUMENTS

DE 102009044715 A1 9/2010

OTHER PUBLICATIONS

PCT International Search Report and Written Opinion of International Searching Authority dated Jul. 14, 2023 corresponding to PCT International Application No. PCT/US2023/064973 filed Mar. 27, 2023.

*Primary Examiner* — Leda T Pham
(74) *Attorney, Agent, or Firm* — Michele S. Fil (57) ABSTRACT

A generator injection tool is provided. The generator injection tool injects an adhesive into a generator that includes a rotor positioned within a stator having a stator vent, the stator and rotor having a gap therebetween. The generator injection tool includes a first carriage sized to fit within the gap, a tube, a first motor, a controller, and an adhesive source. An end of the tube is movable between a first position in which the end is outside of the stator vent and a second position within the stator vent. The first motor is operable to move the tube between the first position and the second position. The controller is operable to selectively activate the first motor to position the end of the tube within the stator vent. The adhesive source moves the adhesive through the tube end to inject a portion of the adhesive into the stator vent.

12 Claims, 7 Drawing Sheets

SEC. A-A

GENERATOR INJECTION TOOL

BACKGROUND

In turbine generators, and other large high voltage dynamo-electric machines, elements called side ripple springs are conventionally used between the coils and the side walls of a core slot to retain the coils in position and make them less subject to vibration. Due to the different coefficients of friction involved between the components, the side ripple springs may have a tendency to move with the coil during expansion and contraction of the coil. If a bias exists in the different coefficients of friction between the components, the side ripple spring may not move back to the previous position, resulting in longitudinal movement. The longitudinal movement of the side ripple spring is generally referred to as migration. The end of the side ripple spring can migrate out axially until it comes into contact with the side of a coil, at which point it begins to wear into the coil insulation. Once this happens, a ground fault can occur due to the stator coil having conductive path to ground. Current solutions to this problem involve disassembly of the generator, including removal of the rotor, and applying adhesive by hand to bond the side ripple spring to the stator core or rebuilding stator components. To reduce disassembly, it is desirable to inject the adhesive without removing the rotor from the stator.

BRIEF SUMMARY

A generator injection tool is used to inject an adhesive into a generator that includes a rotor positioned within a stator having a gap therebetween. The stator includes a stator vent. The generator injection tool includes a first carriage sized to fit within the gap, a tube guide attached to the first carriage, a tube partially supported by the tube guide, a first motor coupled to the tube guide, a controller, and an adhesive source. The tube includes a first end and a second end, the second end movable between a first position in which the second end is outside of the stator vent and a second position in which the second end is positioned within the stator vent. The first motor is operable to move the tube between the first position and the second position. The controller is operable to selectively activate the first motor to position the second end of the tube in the second position within the stator vent. The adhesive source is operable to move the adhesive through the tube from the first end to the second end to inject a portion of the adhesive into the stator vent when the tube is in the second position.

A method to inject an adhesive into a stator vent within a stator of a generator that includes a rotor positioned within the stator while the rotor is positioned within the stator includes the steps of positioning a first carriage so that the first carriage is positioned in a gap between the stator and a rotor and radially inward of the stator vent of the stator, directing by a tube guide attached to the first carriage a tube into the stator vent to a first position, the tube guide driven by a first motor, and injecting a predetermined amount of adhesive from an external source through the tube and out of a first nozzle attached to the end of the tube to the first position.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

The disclosure presents a generator injection tool as well as a method that allows for a controlled application of adhesive between the stator vent wall and the side ripple spring to facilitate a bond while the rotor is installed within the stator. In addition, a generator cleaning tool allows for cleaning and inspection of the generator while the rotor is installed in the stator.

Figure 1:
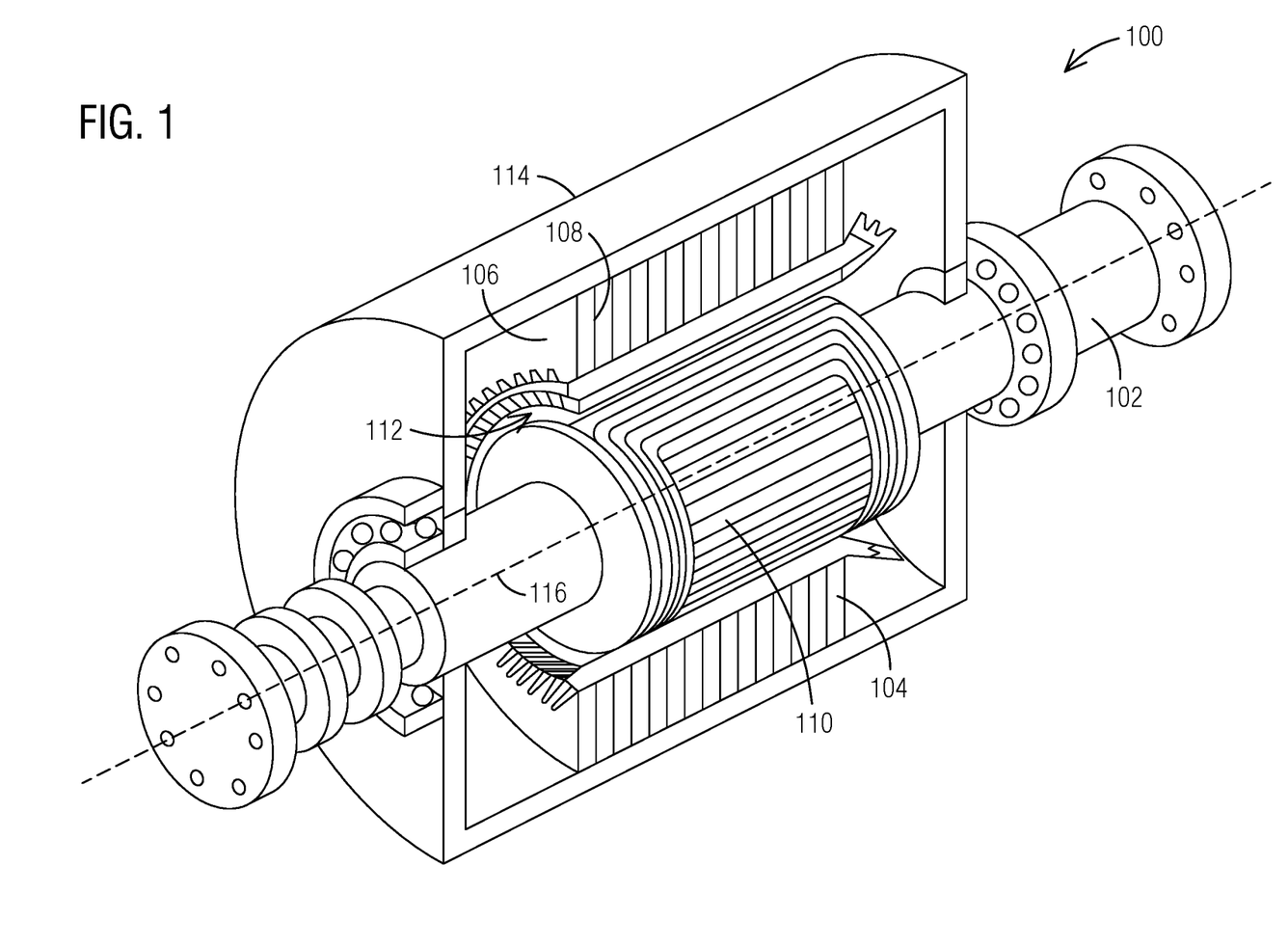
FIG. 1 illustrates a perspective partially sectioned view of a generator including a stator and a rotor.

FIG. 1 illustrates a generator 100 that includes a rotor 102 supported for rotation about a longitudinal or central axis 116. The rotor 102 is positioned within a stator 104 and cooperates with the stator 104 to define an annular air gap 112. The stator 104 is generally enclosed within a housing 114 that protects the stator 104 from the external environment.

The rotor 102 includes rotor windings 110 that are arranged around the rotor 102 and that are operable to generate a magnetic field when energized.

The stator 104 includes a plurality of laminations 106 that are stacked along the central axis 116 to define a stator core. An insulating layer 108 is typically positioned between each of the laminations 106 and acts to inhibit the flow of unwanted electrical currents between the laminations 106. Each of the laminations 106 is shaped to define a plurality of radially extending teeth with adjacent teeth cooperating to define longitudinally extending core slots 202 in which stator windings are positioned.

Figure 2:
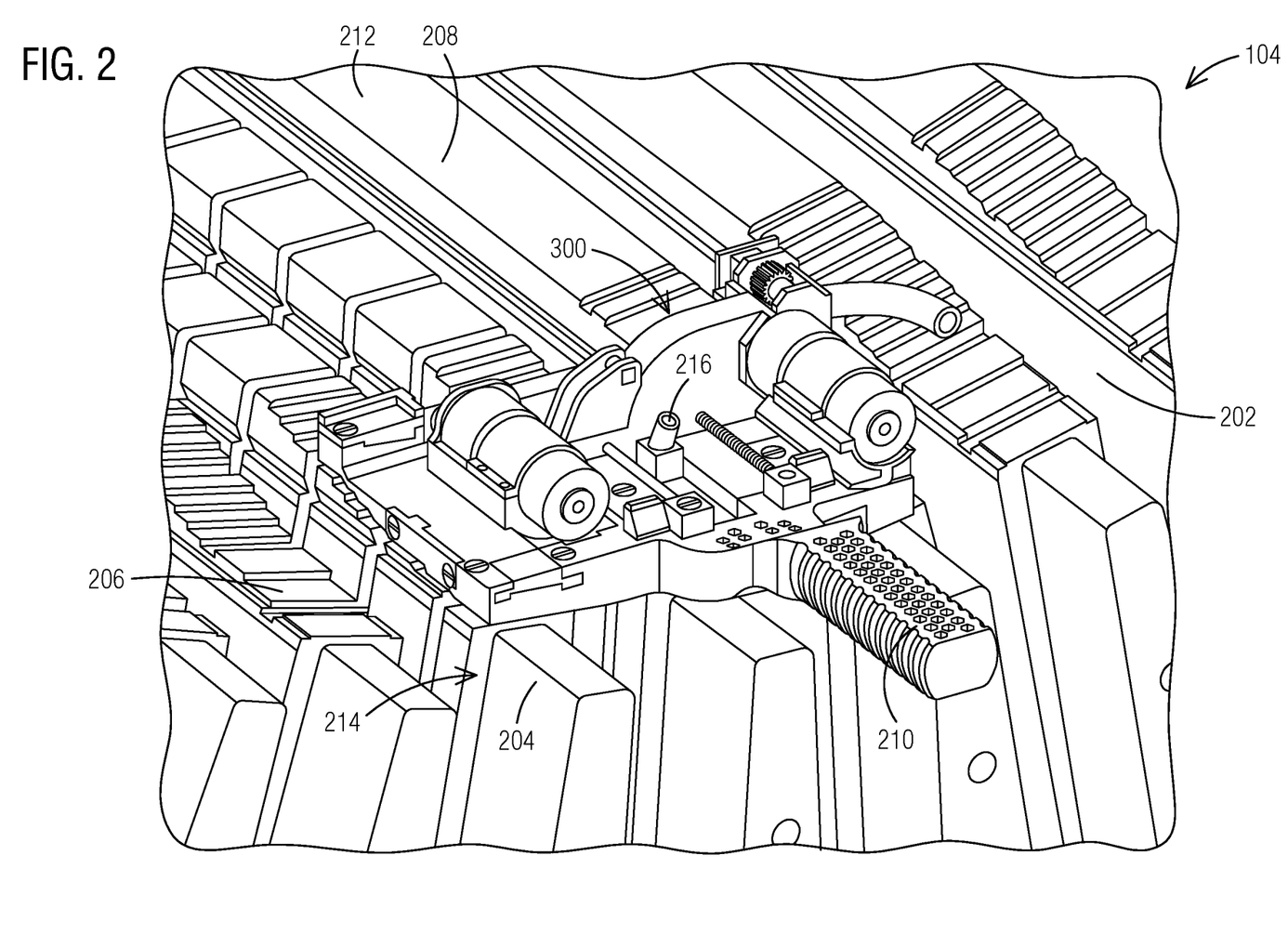
FIG. 2 illustrates a perspective view of a stator core step iron region with an attached generator injection tool.

FIG. 2 illustrates a generator injection tool 300 positioned on a step iron portion 206 of the stator core. The stator core has a stator core bore 212 aligned with the central axis 116 that includes stator bars 204 having a straight bore portion 208 along with the step iron portion 206 adjacent to one of the stator axial ends. The straight bore portion 208 has a generally constant diameter along the axial direction, while the step iron portion 206 incorporates a stepped increase in diameter along an axial direction outboard of the adjoining straight bore portion 208. The stator core includes core slots 202 that extend axially along the central axis 116. Radial stator vents 214 extend at a 90 degree angle to the core slots 202 and allow a cooling flow to cool the stator 104. The generator injection tool 300 is positioned radially inward of at least one of the core slots 202. In an embodiment, the generator injection tool 300 includes a first handle 210 to manually position the generator injection tool 300 within the air gap 112, along the step iron portion 206, and radially inward of at least one of the core slots 202. The generator injection tool 300 may be securely held to the step iron portion 206 by magnetic force. A borescope port 216 allows for an attachment to a camera to view and image the stator vent 214.

Figure 3:
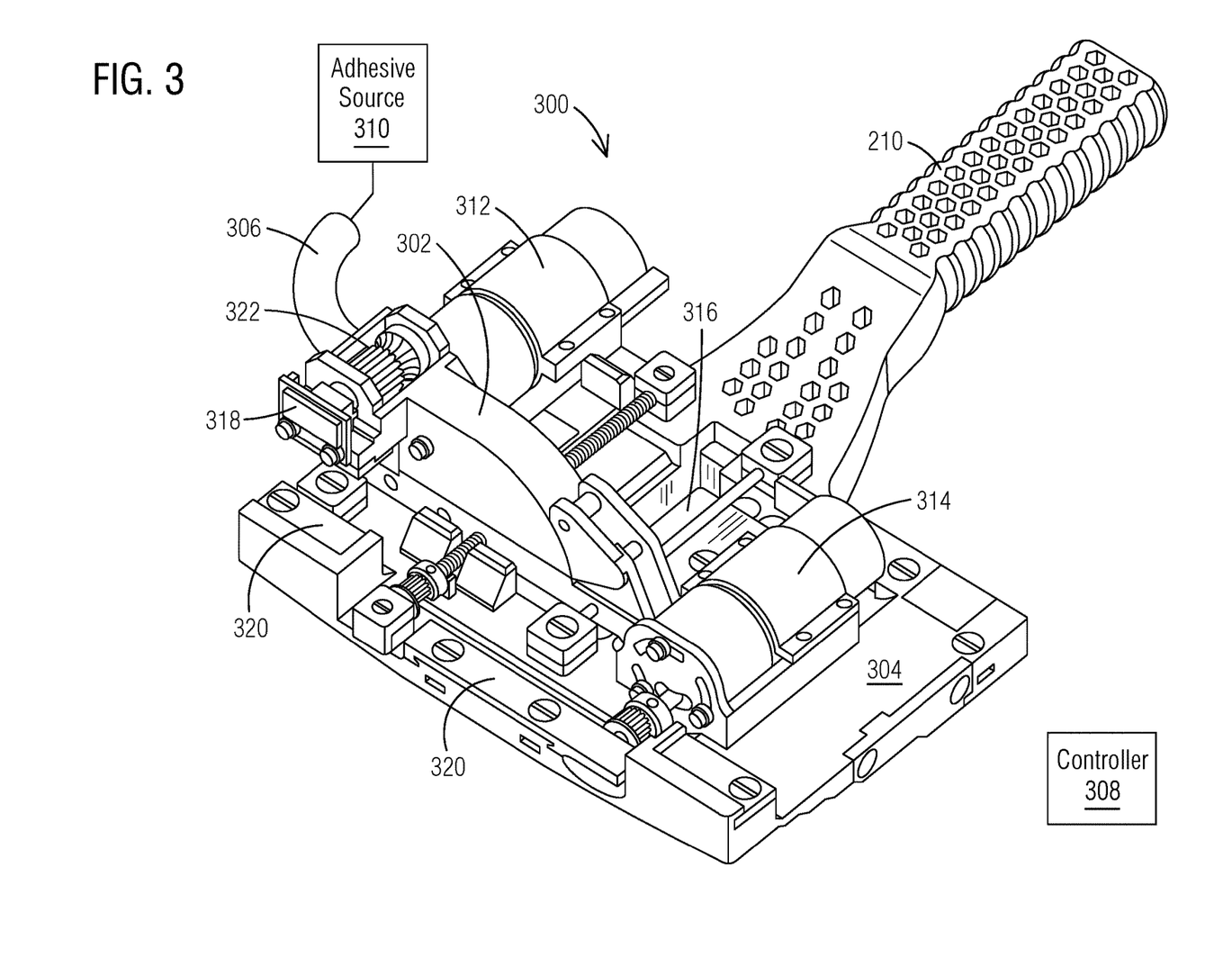
FIG. 3 illustrates a perspective view of the generator injection tool.

FIG. 3 illustrates a perspective view of the generator injection tool 300. The generator injection tool 300 includes a first carriage 304, a tube guide 302, a tube 306, a controller 308, and an adhesive source 310. The first carriage 304 provides a structural body for the attachment and support of other components of the generator injection tool 300. The bottom surface (not shown) profile of the generator injection tool 300 contacts and aligns with the geometry of the step iron portion 206. In an embodiment, the bottom surface of the generator injection tool 300 may include slot guides, or portions of the first carriage 304 that protrude from the bottom surface and fit within the core slots 202. In some constructions, the first carriage 304 as well as other components of the generator injection tool 300 may be additively manufactured to reduce the total number of parts and to allow for the formation of shapes or cavities that are otherwise not possible using conventional manufacturing techniques.

The tube guide 302 is attached to the first carriage 304 and driven by a first motor 312. The tube guide 302 directs the tube 306 carrying an adhesive into the stator vent 214. A second motor 314 attached to the first carriage 304 moves the tube guide 302 and the tube 306 in an axial direction along the central axis 116 within a carriage slot 316 in the first carriage 304 in order to reach another position in an adjacent stator vent 214.

Figure 4:
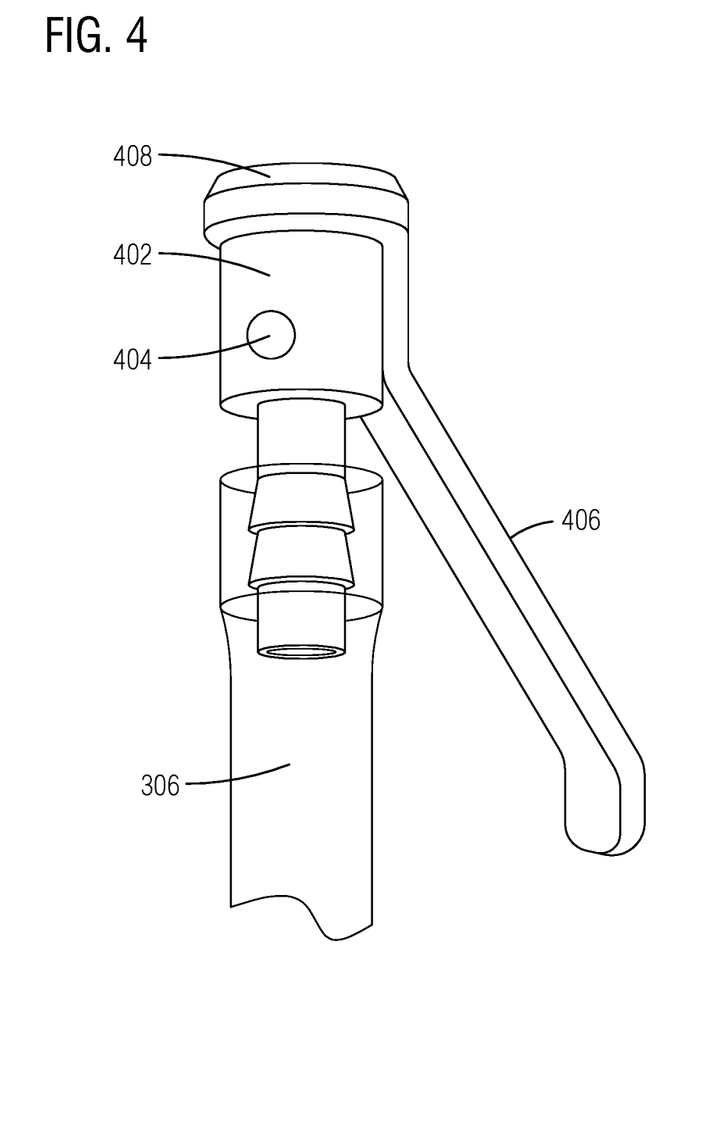
FIG. 4 illustrates a perspective view of a nozzle attached to an adhesive tube.

The tube 306 that carries the adhesive includes a first end and a second end. The first end is attached to an adhesive source 310 and the second end is movable between a first position outside of the stator vent 214 and a second position within the stator vent 214. The tube 306 extends through the tube guide 302 on the first carriage 304 from one side of the first carriage 304 through the first carriage structural body to another side. The first motor 312, controlled via the controller 308, is operable to move the second end between the first position and the second position. A nozzle 402 (as shown in FIG. 4) is attached to the second end to dispense the adhesive within the stator vent 214.

The first motor 312 and the second motor 314 are controlled via the controller 308. Each of the first motor 312 and the second motor 314 may be a DC gear motor that is driven by the controller 308. The controller 308 controls, via the first motor 312, the speed at which the tube 306 is guided into the stator vent 214 and the depth the tube 306 is positioned within the stator vent 214. The controller 308 also controls the axial positioning, via the second motor 314, of the tube 306 to a further position within an adjacent stator vent 214.

An encoder 318 is also attached to the first carriage 304. Through an attachment to a gear 322 positioned on the tube guide 302, the encoder 318 relates the rotational movement of the gear 322 to the linear movement of the tube 306 to determine the position of the second end of the tube 306 within the stator vent 214.

In the illustrated construction, the first carriage 304 also includes several permanent magnets 320 located on the first carriage 304 at various locations that engage the step iron portion 206 to keep the first carriage 304 stationary on step iron portion 206 while in operation.

A borescope may be positioned through a borescope port 216, as shown in FIG. 2, to enable positioning of a camera within the stator vent 214. The camera allows a technician to visually inspect the stator vent 214 to enable more precise positioning of the nozzle 402. A light emitting diode on the borescope illuminates a desired area within the generator. The camera is operable to take an image of the stator vent 214.

Figure 5:
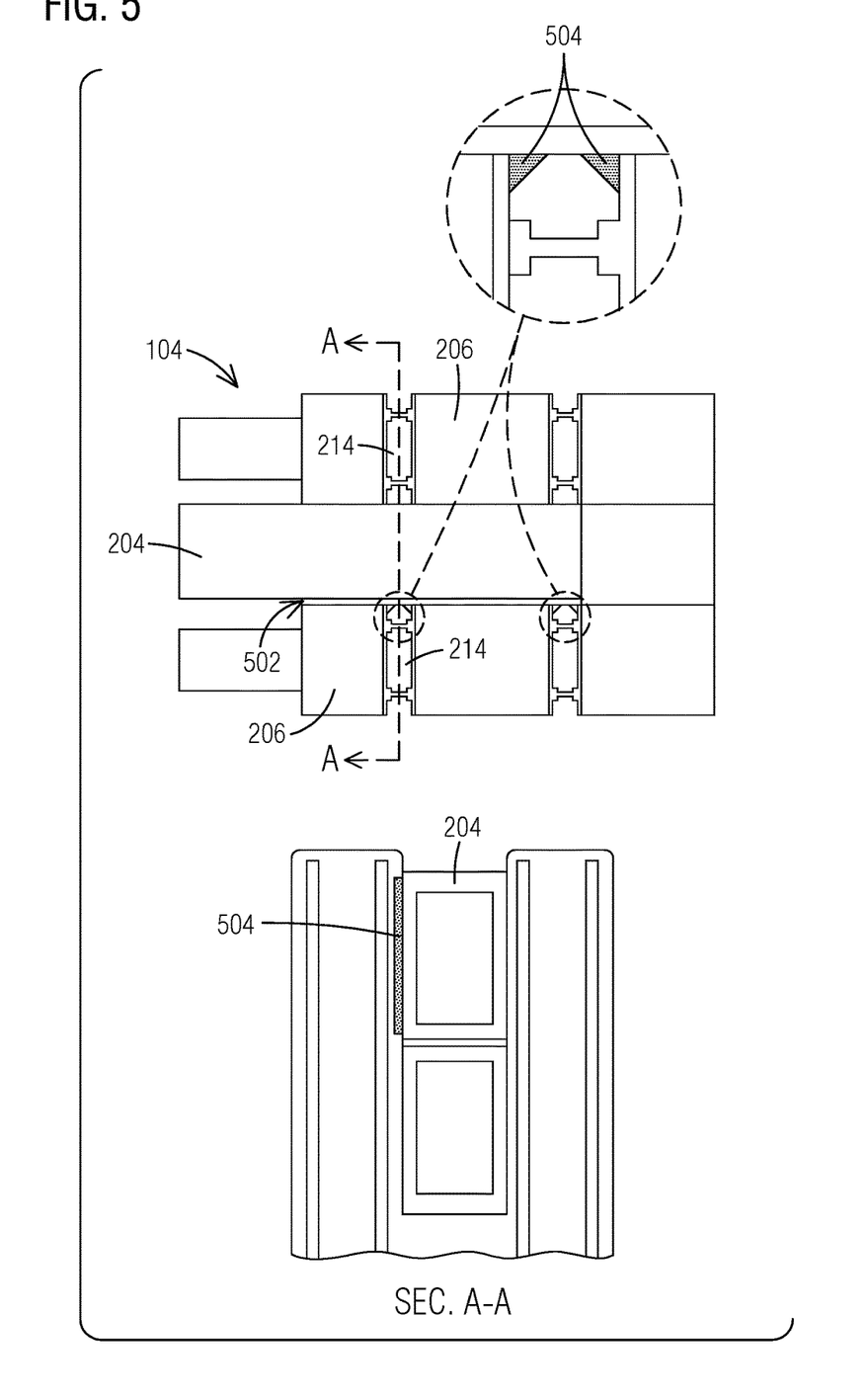
FIG. 5 illustrates a top view of a portion of the stator.

FIG. 4 illustrates a perspective view of the nozzle 402 as attached to the second end of the tube 306. The nozzle 402 is positioned as explained above within the stator vent 214 to dispense adhesive. The adhesive is dispensed through at least one orifice 404 in the nozzle 402. The profile of the nozzle end 408 is shaped to form the adhesive into a desired shaped within the stator vent 214. This desired shaped may be a two-fillet pattern as shown in FIG. 5. A spring locating tab 406 is used in some cases to apply a force to the nozzle 402 in order to keep pressure against a side ripple spring 502.

FIG. 5 illustrates a top view of a portion of the stator 104 showing the desired location of the adhesive within the stator vent 214. Side ripple springs 502, in the form of a corrugated springs, are shown in FIG. 5 positioned within the stator vents 214. A two-fillet pattern 504 of adhesive is shown between the stator bar 204 and the side ripple spring 502. In order to form the two fillet pattern 504 in the correct location, the nozzle 402 of the generator injection tool 300 is positioned within the stator vent 214 by the controller 308 to the desired position. A predetermined amount of adhesive is pumped through the tube 306 and dispensed by the nozzle 402 to the correct location. The predetermined amount of adhesive creates the two-fillet pattern 504 which has the ability to bond the side ripple spring 502 to the stator bar 204 without clogging the stator vent 214 to the cooling flow.

Figure 6:
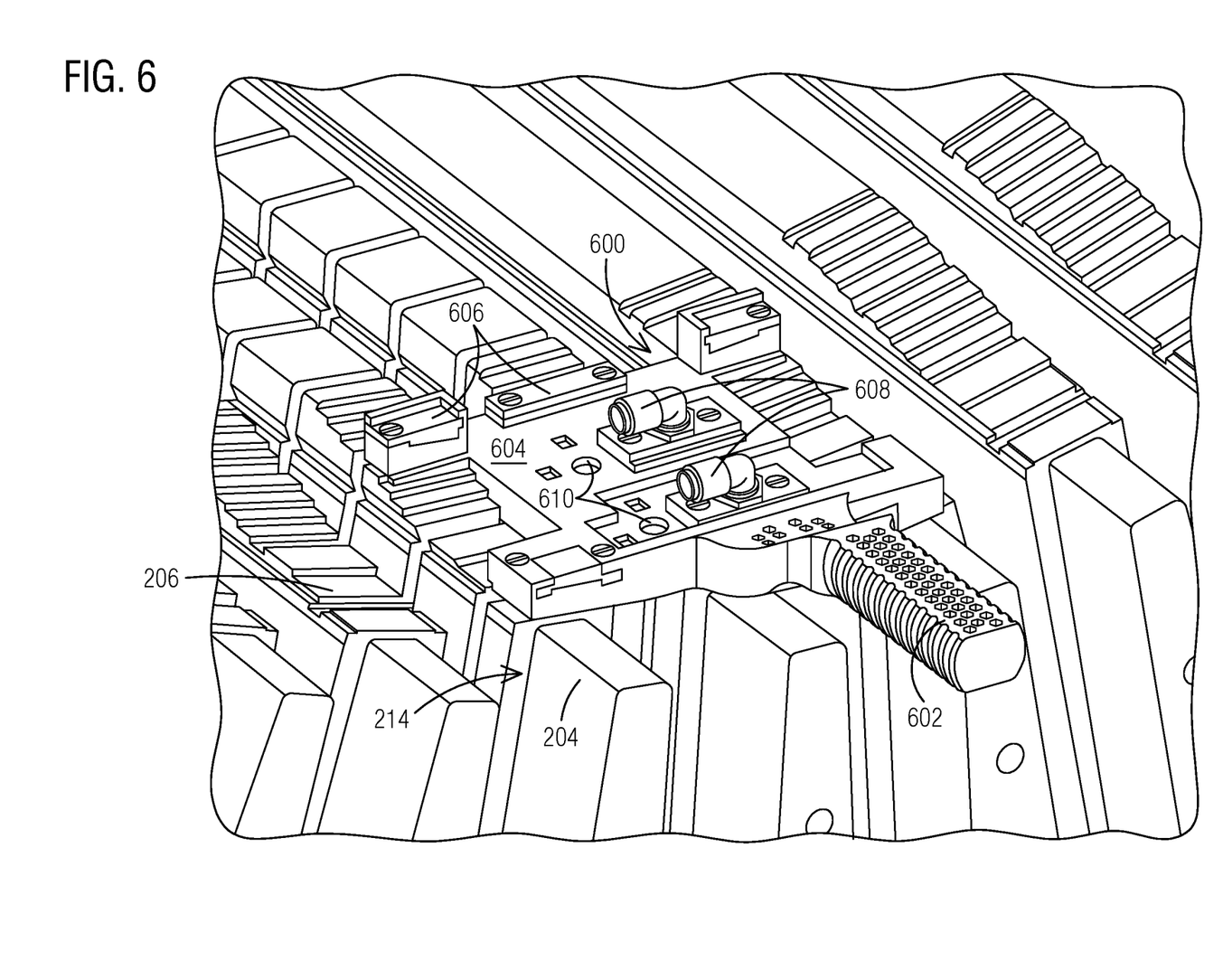
FIG. 6 illustrates a perspective view of the generator cleaning tool.

FIG. 6 illustrates a perspective view of a generator cleaning tool 600 positioned on the step iron portion 206 of the stator core. Similar to the generator injection tool 300, the generator cleaning tool 600 includes a second carriage 604 that provides a structural body for the attachment and support of other components of the generator cleaning tool 600. The bottom surface (not shown) profile of the generator cleaning tool 600 contacts and aligns with the geometry of the step iron portion 206. In an embodiment, the generator cleaning tool 600 includes a second handle 602 to manually position the generator cleaning tool 600 within the air gap 112, along the step iron portion 206, and radially inward of at least one of the core slots 202. In some constructions, the second carriage 604 as well as other components of the generator cleaning tool 600 may be additively manufactured to reduce the total number of parts and to allow for the formation of shapes or cavities that are otherwise not possible using conventional manufacturing techniques.

Also similar to the first carriage 304, the second carriage 604 includes several permanent magnets 606 that engage the step iron portion 206 to keep the second carriage 604 stationary and in place on the step iron portion 206. The second carriage 604 also includes tube spray adapters 608 coupled to the second carriage 604. The tube spray adapters 608 act as an attachment for at least one spray tube. The at least one spray tube may be attached when desired and then detached. In an embodiment, each spray tube extends from the tube spray adapters 608 to a pump and from the tube spray adapters 608 through the second carriage 604 and out to the stator vents 214. The pump enables a fluid spray into the stator vents 214 in order to clean and degrease the stator vents 214.

Further, the second carriage 604 includes at least one port 610 so that a borescope may be positioned through one of the ports 610 to enable positioning of a camera within the stator vent 214. The camera allows a technician to visually inspect the stator vent 214 and the step iron portion 206. A light emitting diode on the borescope illuminates the area. The camera is operable to take an image of the stator vent 214 and/or the step iron portion 206.

Figure 7:
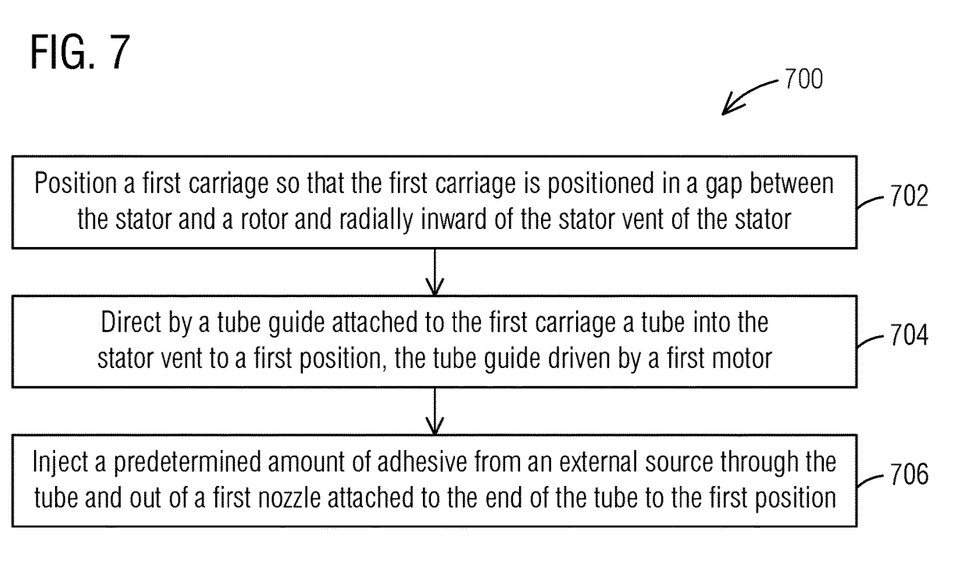
FIG. 7 illustrates a flowchart of a method in accordance with one embodiment.

FIG. 7 depicts a flowchart depicting a method 700 to inject an adhesive into a stator vent 214 within a stator 104 of a generator 100 while the rotor 102 is positioned within the stator 104. In block 702, method 700 positions a first carriage 304 so that the first carriage 304 is positioned in an air gap 112 between the stator 104 and a rotor 102 and radially inward of the stator vent 214 of the stator 104. In block 704, method 700 directs, by a tube guide 302 attached to the first carriage 304, a tube 306 into the stator vent 214 to a first position, the tube guide 302 driven by a first motor 312. In block 706, method 700 injects a predetermined amount of adhesive from an external adhesive source 310 through the tube 306 and out of a first nozzle 402 attached to the nozzle end 408 of the tube 306 to the first position.

In operation, the user places the generator injection tool 300 and/or generator cleaning tool 600 in the air gap 112 between the rotor 102 and the stator 104. The permanent magnets 320 magnetically engage the step iron portion 206 to hold the generator injection tool 300/generator cleaning tool 600 in positions where gravity does not hold the tool in place.

The generator injection tool 300 allows for the injection of adhesive into the generator 100 with the rotor 102 installed within the stator 104 avoiding disassembly. The first motor 312 and the second motor 314 can be operated to move the tube 306 into a desired position within the stator vent 214 prior to dispensing the adhesive. The controller 308 can then operate an adhesive source to pump a predetermined amount of adhesive in the desired position.

The generator cleaning tool 600 allows for the cleaning of the stator vents 214 to be done with the rotor 102 installed within the stator 104 avoiding disassembly. Using its low-profile body that fits in the low-clearance air gap 112 between the rotor 102 and the stator 104 the second carriage aligns tubes with the stator vents 214 to be cleaned. In addition, the generator injection tool 300 and generator cleaning tool 600 may be used to direct a borescope via a borescope port 216 and ports, respectively, to inspect the space of the stator vent.

Although an exemplary embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A generator injection tool for injecting an adhesive into a generator that includes a rotor positioned within a stator having a stator vent, the rotor and the stator cooperating to define a gap, the generator injection tool, comprising:
    a first carriage sized to fit within the gap;
    a tube guide attached to the first carriage;
    a tube partially supported by the tube guide, the tube including a first end and a second end, the second end movable between a first position in which the second end is outside of the stator vent and a second position in which the second end is positioned within the stator vent;
    a first motor coupled to the tube guide and operable to move the tube between the first position and the second position;
    a controller operable to selectively activate the first motor to position the second end of the tube in the second position within the stator vent; and
    an adhesive source operable to move the adhesive through the tube from the first end to the second end to inject a portion of the adhesive into the stator vent when the tube is in the second position.

2. The generator injection tool of claim 1, further comprising a second motor controlled via the controller, the second motor coupled to the first carriage to move the tube axially within a slot in the first carriage so that the tube delivers adhesive to a third position within an adjacent stator vent.

3. The generator injection tool of claim 1, wherein the tube guide further comprises an encoder to determine a position of the tube within the stator vent.

4. The generator injection tool of claim 1, further comprising a camera coupled to the first carriage and operable to take an image of the stator vent.

5. The generator injection tool of claim 1, further comprising a first handle, the first handle is attached to the first carriage to manually install the first carriage in the gap.

6. The generator injection tool of claim 1, further comprising a nozzle attached to the second end, the nozzle including an orifice through which adhesive is dispensed to the second position.

7. The generator injection tool of claim 6, wherein a profile of the nozzle creates a two-fillet pattern of adhesive when the adhesive is dispensed to the second position.

8. A method to inject an adhesive into a stator vent within a stator of a generator that includes a rotor positioned within the stator while the rotor is positioned within the stator, the method comprising:
    positioning a first carriage so that the first carriage is positioned in a gap between the stator and a rotor and radially inward of the stator vent of the stator;
    directing by a tube guide attached to the first carriage a tube into the stator vent to a first position, the tube guide driven by a first motor; and
    injecting a predetermined amount of adhesive from an external source through the tube and out of a first nozzle attached to the end of the tube to the first position.

9. The method of claim 8, wherein the directing further comprises determining a position of the tube within the stator vent utilizing an encoder attached to the tube guide.

10. The method of claim 8, further comprising translating the tube axially through a slot in the first carriage by a second motor attached to the first carriage to a second position to inject the predetermined amount of adhesive to the second position.

11. The method of claim 8, further positioning a second carriage in the gap between the stator and the rotor of the generator prior to the attaching of the first carriage, wherein the second carriage includes a second tube with an end, the positioning including:
    positioning the second carriage radially inward of the stator vent of the stator;
    aligning the end of the second tube with the stator vent; and
    pumping a fluid through the second tube and and out the end into the stator vent to clean the stator vent.

12. The method of claim 11, further comprising:
    removing the second tube;

mounting a camera to an attachment on the second carriage;
directing the camera to the stator vent;
inspecting the stator vent via the camera.

\* \* \* \* \*